United States Patent [19]

Szabo

[11] 4,062,479

[45] Dec. 13, 1977

[54] NON-RETURN VALVE ASSEMBLIES IN INJECTION MOLDING MACHINES

[75] Inventor: Bela G. Szabo, Carnegie, Pa.

[73] Assignee: Bruce Plastics, Inc., Pittsburgh, Pa.

[21] Appl. No.: 732,390

[22] Filed: Oct. 14, 1976

[51] Int. Cl.$^2$ .............................................. B29F 1/04
[52] U.S. Cl. .............................. 222/495; 137/533.27; 425/564
[58] Field of Search ............... 222/413, 495, 496, 497; 425/146, 245 R, 245 NS, DIG. 224; 137/533.21, 533.27, 543.15, 543.19

[56] References Cited

U.S. PATENT DOCUMENTS

| | | | |
|---|---|---|---|
| 2,885,734 | 5/1959 | Wucher | 425/245 R |
| 3,550,208 | 12/1970 | Peters | 425/245 R X |

FOREIGN PATENT DOCUMENTS

| | | | |
|---|---|---|---|
| 1,144,411 | 10/1957 | France | 425/245 R |

Primary Examiner—Robert B. Reeves

Assistant Examiner—David A. Scherbel
Attorney, Agent, or Firm—Samuel Lebowitz

[57] ABSTRACT

An injection molding apparatus having a non-return valve assembly mounted on the front end of an extruder screw within a heated barrel for accummulating a charge of thermoplastic material in the forepart of the barrel by the retrograde and rotary movement of the screw when the valve is in open position, and by ejecting the charge through a nozzle mounted at the front of the barrel by the reverse reciprocating movement of the feedscrew, which simultaneously forces the valve to close and prevents escape of the material backward into the barrel along the screw. The valve is formed of two components, one of which is shaped with a convexly contoured annular protuberance which is alternately spaced from the other one, and in close abutment therewith, in the alternate movements of the feedscrew, with only screws or bolts connecting the two, to permit freedom of movement therebetween.

12 Claims, 6 Drawing Figures

Fig. 3
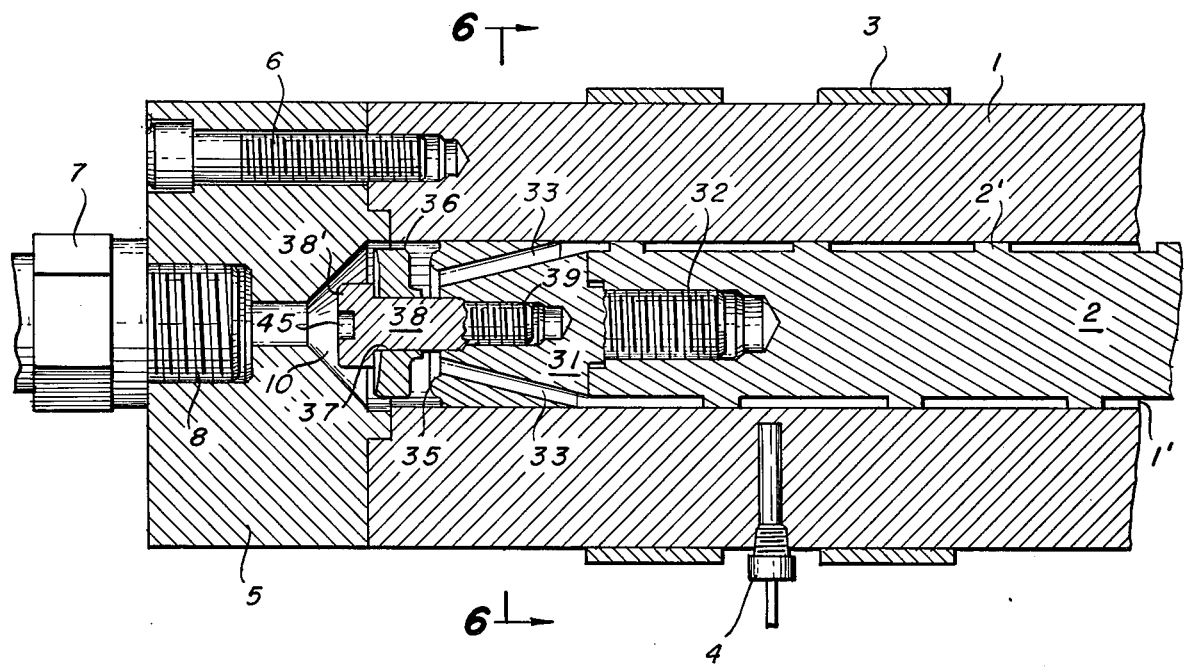
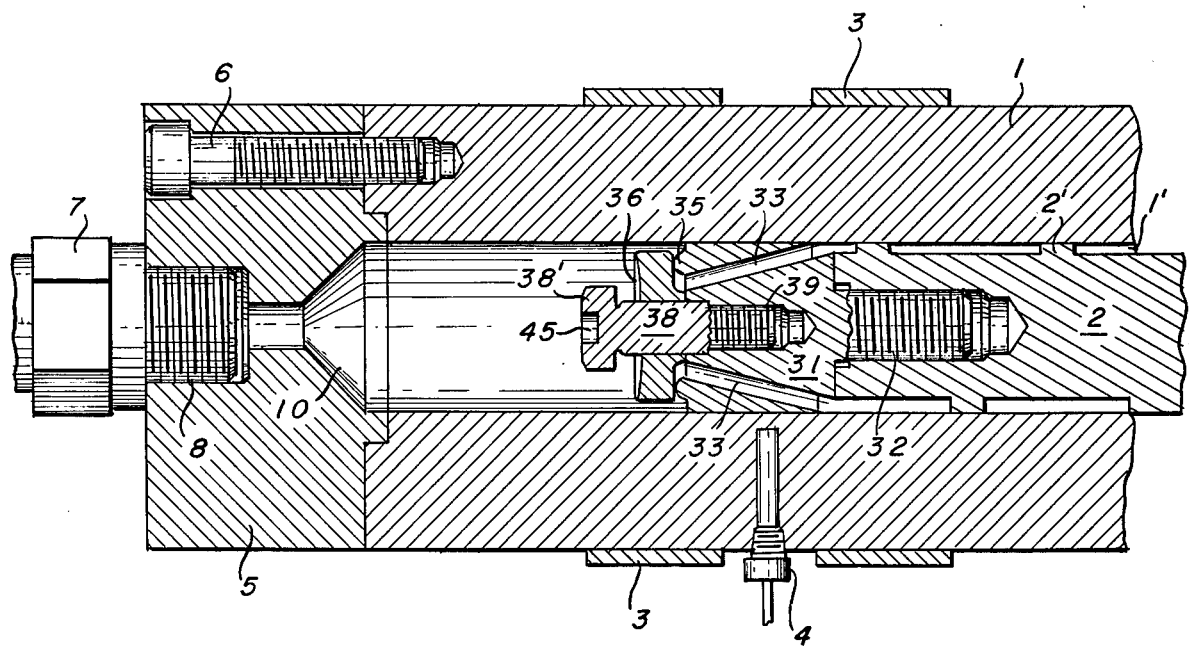
Fig. 4

NON-RETURN VALVE ASSEMBLIES IN INJECTION MOLDING MACHINES

This invention relates to injection molding machines and more particularly to improvements in the non-return valve assembly at the terminal end of the injection screw operating within the barrel of the molding machine to accummulate a charge of the thermoplastic material in a fluid state at the front of the barrel, and to eject the same therefrom through a nozzle communicating with a mold cavity.

It is an object of the present invention to provide a non-return valve assembly which is rugged and reliable in its operation and which, because of its simplified construction of few parts, is of low cost and capable of functioning over long periods of time without requiring any maintenance service.

It is another object of the invention to provide a non-return valve assembly which may be interchanged readily to accomodate it to different operating conditions because of its simple mounting at the forward end of an injection screw.

It is another object of the present invention to provide a non-return valve assembly which may be adjusted easily to vary the operating characteristics thereof, such as its speed of action. The relatively large area of the annular seal between the movable valve parts assures that the same does not "hang open" when foreign particles are mixed or molded with the plastic. The assembly is "self-cleaning" and also provides a capability of color changes in sucessive runs of the machine, without excessive waste of materials or "postbleeding" of the the previously run colors.

The valve assemblies of the instant invention are capable of connection to any type of reciprocating injection molding machines wherein the extruder screws experience a rotary motion during the retrograde movement of the screws for feeding the plastic material into the chambers adjacent the nozzles preparatory to the reciprocating movement of the screws in the reverse dirction for injecting the fluid thermoplastic mass through the nozzle. The valve assemblies in accordance with the invention assure that no plastic material escapes rearwardly from the discharge chamber in front of the screw during the last-mentioned injecting stroke.

The instant invention presents many improvements over such arrangements as are disclosed in U.S. Pat. No. 3,550,208, Dec. 29, 1970, and U.S. Pat. No. 3,590,439, July 6, 1971.

Other objects and purposes will appear from the detailed description of the invention following hereinafter, taken in conjunction with the accompanying drawings, wherein FIG. 1 is a sectional view of the non-return valve at the forward end of the extruder screw at the beginning of its rotary backward motion within the barrel;

FIG. 3 is a sectional view corresponding to FIG. 1, showing a second embodiment of the non-return valve on the front end of the injector screw, in position at the beginning of the rotary backward movement of the latter;

FIG. 4 is a sectional view of the second embodiment of the non-return valve shown in FIG. 3, and corresponding to the positioning of the parts in FIG. 2, at the beginning of the forward reciprocating stroke of the injector screw;

Figure 1:
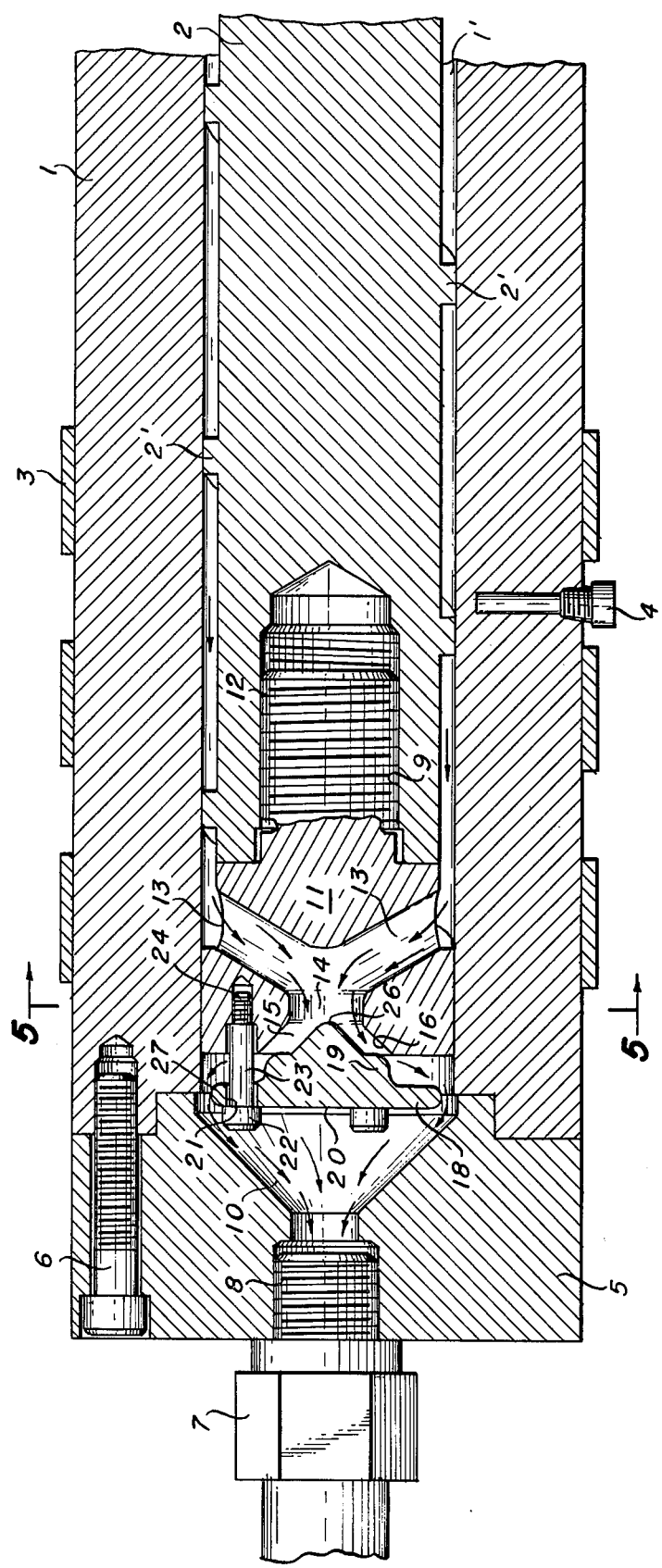
Figure 2:
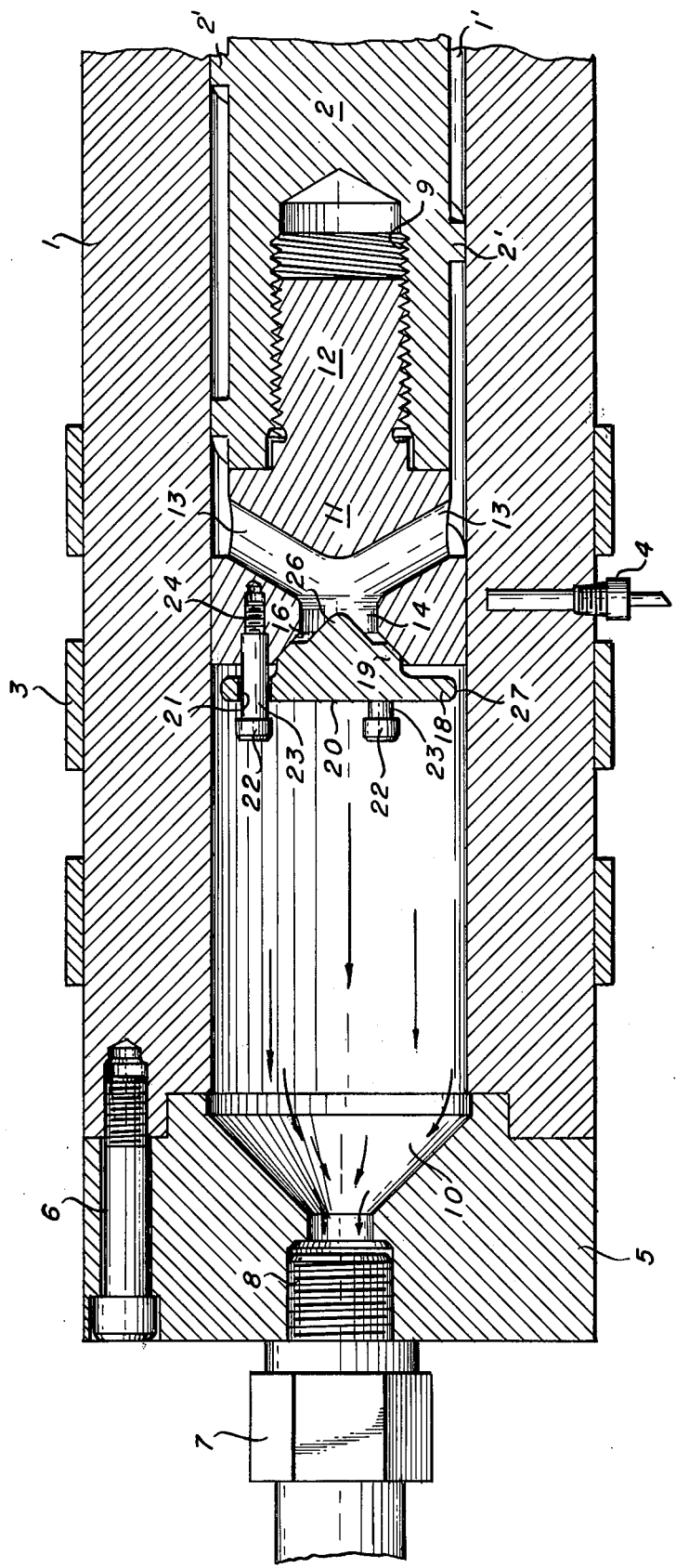
FIG. 2 is a vertical sectional view corresponding to FIG. 1, illustrating the position of the part at the conclusion of the rotary backward movement of the screw and at the start of the straight forward motion of the extruder screw for forcing the charge of thermoplastic material accummulated at the front of the barrel, through the injection nozzle.

FIGS. 1 and 2 of the drawings illustrate one embodiment of the improved non-return valve assembly applied to the front end of an injection screw of injection molding machines of conventional construction Such constructions may assume different forms, which consist essentially of an extruder barrel 1 having a cylindrical bore 1' in which is disposed the extruder screw 2 provided with spiral flights 2' on the periphery thereof for feeding the molding charge of thermoplastic material from a source of plastic material in either pellet or powder form at the rear part of the machines toward the forward part of the barrel. The barrel is generally heated electrically by resistance bands 3 surrounding it, and the intensity of which may be controlled by a thermocouple 4 so that the thermoplastic material which accummulates at the forward end of the barrel is in a fluid state, wherefrom it is discharged through the funnel-shaped opening 10 in the nozzle mount 5. The latter is affixed to the front of the barrel 1 by means of a plurality of bolts 6 of any suitable number, for example, three. The nozzle 7 is threadedly mounted at the front end of the mounting block 5 by engagement of the threaded end of the nozzle 8 with a suitably threaded opening in the central portion of the front end of the nozzle mounting 5. The front end of the nozzle 7, not shown, is provided with one or more openings in communcation with the mold cavity for receiving the material injected thereinto by the injector screw 2 functioning as a reciprocating plunger during the injection stroke of the screw, indicated by the arrow in FIG. 2.

FIG. 1 shows the position of the parts following the last-mentioned injection cycle and at the start of the backward rotary motion of the feedscrew 2, during which period the forepart of the barrel is filled with the plastic material, as shown in FIG. 2.

The non-return valve of the present invention is composed of a valve body element, an auxiliary valve plate element cooperating therewith at the front thereof, and integrating or connecting means between them to control the movement of these two valve elements between their two alternate positions, permitting the easy flow of the plastic material from the outer periphery of the feedscrew to the chamber in front thereof, and the positive sealing of this passage from the chamber of the barrel during the injection cycle of the material through the nozzle to prevent any return movement of the material to the bore of the barrel behind the valve assembly.

Figure 5:
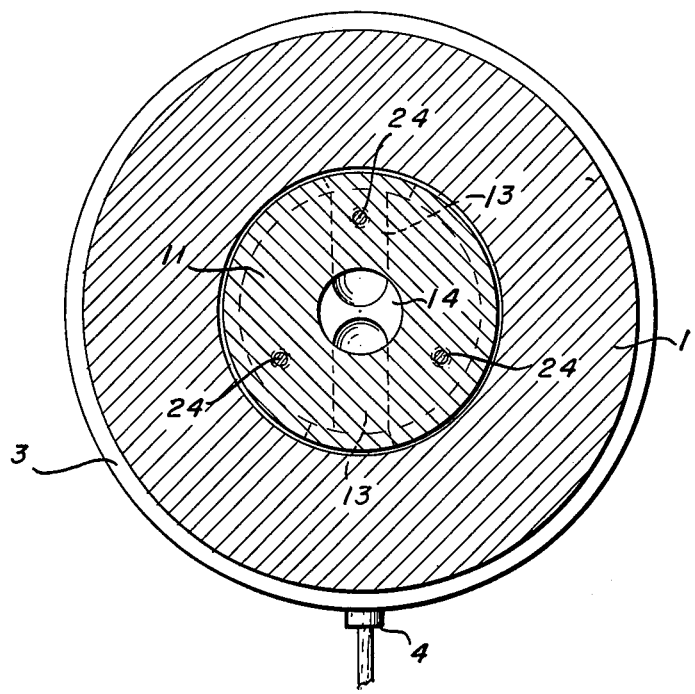
FIG. 5 is a vertical sectional view along line 5—5 of FIG. 1.

In the embodiment shown in FIGS. 1, 2 and 5, the valve body 11 is provided with a central threaded stud 12 which engages the correspondingly threaded bore 9 at the forward end of the ejector screw 2, so that the valve body 11 is capable of rapid and easy mounting on the end of the feed screw 2. The rear portion of the valve body 11 has a diameter corresponding to the outer diameter of the screw 2 at the base of the spiral flights, while the forward portion thereof corresponds to the diameter of the barrel.

The circular valve plate element 18 in front of the valve body 11 is mounted for reciprocating movement relative to the latter by providing a plurality of equidistantly displaced bores 21 adjacent the periphery thereof for accommodating headed bolts or screws 22 fitted with threaded ends 24 which engage threaded openings in the front of valve body 11. The shanks 23 of bolts 22 fit loosely within the openings 21 in the valve plate to permit the smooth sliding movement of the plate relative to the valve body between the alternate positions shown in FIGS. 1 and 2, illustrating, respectively, the non-return valve in its open and closed positions.

The valve body 11 is provided with a plurality of inclined passages 13 extending from the periphery thereof towards the central portion 14 from which extends the forwardly and outwardly flaring passageway 15 delineated by the the rear conical face of the valve plate 18 and the frusto-conical wall 16 extending from the central portion 14. As shown in FIG. 5, two diametrally opposed passages 13 are provided for feeding the plastic material into the center of the valve body wherefrom it is directed outwardly through passageway 15, defined by the rounded rear conical face 26 of the valve plate 18 and conical wall 16. The streamlined flow of the plastic material continues past the outer periphery 27 of the valve plate 18, which is of smaller diameter than the barrel and is rounded to enhance the smooth and uninterrupted flow of the material into the space in front of the front face 20 of the valve plate.

The rear portion of the valve plate 18 is provided with a convexly contoured annular protuberance 19 so that it offers no perceptible hindrance to the passage of the plastic material through passageway 15 but which nevertheless is capable of providing a "shut-off" land of substantial extent when it is forced into contact with the adjacent conical wall 16 of the main valve body 11, to effect a reliable seal against the plastic material escaping from the forepart of the barrel to the passages 14 and 13 and to the spaces between the flights 2' of the spiral feed screw. The cross-sectional area of the protuberance 19 may be varied by decreasing or increasing the outermost radius thereof and even flattening it, as indicated in FIG. 2, to control the "cut-off time" of the non-return valve action, that is, to make it operate faster or slower. This control may also be obtained by varying the distance of the movement of the valve plate between its alternative positions and this may be done by adjusting the extent of penetration of the threaded ends 24 of the bolts 22 within the valve body and accordingly, the range of possible displacement of the heads of the bolts 22 from the front 21 of the valve plate. These adjustments may be made to suit varying operating conditions and differences in the plastic materials being handled.

Figure 6:
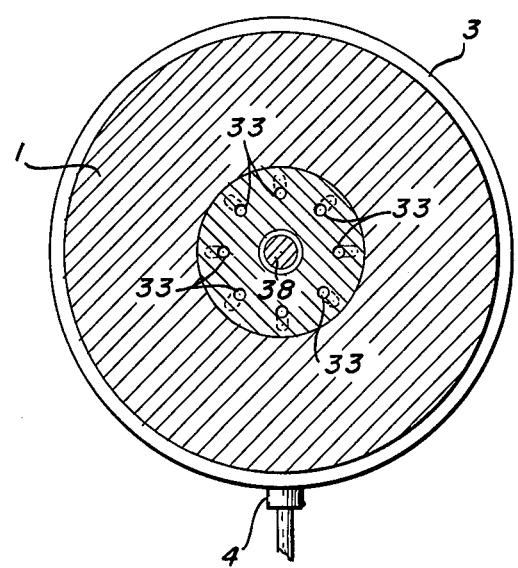
FIG. 6 is a vertical sectional view along line 6—6 of FIG. 3.

In the second embodiment of the invention, shown in FIGS. 3, 4 and 6, the annular protuberance or convexly contoured dam of the non-return valve is formed on the valve body rather than on the valve plate, but the same operating advantages accrue from this arrangement as in the case described above.

The valve assembly is mounted on the front end of the ejector screw 2 operating within the heated barrel, and the corresponding elements of the machine have been designated by the same reference characters as in the case of the first embodiment described above and illustrated in FIGS. 1, 2 and 5. In the construction shown in FIGS. 3 and 4, the valve body 31, having a left-hand thread central stud 32 is affixed to the front end of the feedscrew 2. Eight equidistantly spaced cylindrical passages 33 extend between the ends of the main valve body and incline forwardly from the outer periphery towards the center. The outlets of these passages, which may be 5/32 inch in diameter, surround the threaded bore 39 in the main valve body, into which is threaded the headed bolt 38 on the shank 37 of which, adjacent to the head 38', is slidably mounted on the valve plate 36. This plate is movable from its position shown in FIG. 3 wherein the front face thereof is in abutment with the head 38' of the bolt, to its alternative position shown in FIG. 4, wherein the rear face thereof is in abutment with the annular convexly contoured dam 35.

In the position of the parts shown in FIG. 3, when the feedscrew 2 starts its rotary backward motion, and the pressure on the front face of the valve plate is relieved, the plastic material is free to move through the passages 33 in the main valve body, and through the radial passage defined by the rear wall 40 of the valve plate and front wall of the valve body, including the annular land 35, through the space between the bore of the barrel and the outer periphery of the circular valve plate and into the space in front of the latter, including the chamber 10 leading to the nozzle. The valve plate is contoured at its corners to enhance the free flow of the plastic material in the course of its change in direction around the valve plate, for example, the fillet 43 at the rear of the latter plate may have a radius of ⅛ inch and the corners 44 may have a radius of 1/16 inch. In addition, the inlet openings of the cylindrical passages 33 may be provided with a left-hand lead for the easier flow of the material into these passages coincidentally with the rotation of the feedscrew. Thereby, the continued rotary movement of the screw 2 to the right from the position shown in FIG. 3 to that shown in FIG. 4, results in a smooth filling of the space in the barrel preparatory to the movement of the screw in a straight forward direction to effect the ejection of the accummulated plastic material through the nozzle 7 into the mold cavity. At the start of this movement, the valve plate 36 slides from its position shown in FIG. 3 against the protuberance shown in FIG. 4 to seal off the passage of the plastic material accummulated in the forward chamber from reverse movement back through the passages of the main valve body and the bore of the barrel therebeyond.

In this embodiment, as in the case described above, the timing of the cut-off action of the check valve assembly may be controlled by varying the convexity of the contours of the annular protuberance 35 as well as the distance of travel of the valve plate 36 between its alternate positions, which may be done by adjusting the extent of penetration of the bolt 38 within the main valve body 31. Preferably, the annular protuberance 35 is finished with a flat surface which may be of a width of 0.03 inches, and the limit of travel of the valve plate 36 between its alternate positions may be 5/32 inch.

The dimensions of the valve assembly set forth in the preceding paragraphs are applicable to a valve body movable in a barrel of approximately 1¾ inches in diameter and of a similar length. The main valve body in the first embodiment may have a diameter of nearly 3½ inches and a length of approximately 2⅝ inches. The angular passages 13 may be 11/16 inch in diameter and the central passage 14 may be 1 inch in diameter. All of these dimensions may be varied within the range of operating parameters of injection molding machines of the type under consideration which may vary in screw sizes from ½ inch to 10 inches in diameter. The product of the screw diameter and its length determines the plasticizing or melting capacity of the equipment. The size of the passages and their number are controlled by the availability of space, without jeopardizing the yield strength of the metal under pressure and heat encountered in the production cycle. The opening space between the valve body and the valve plate is determined by the smallest opening within the nozzle block, that is, the total area of the passages in the valve assembly leading to the latter must be equal to or larger than the final passage.

Many changes may be made in the disposition of the passages in the main valve body relative to the valve plate and the damming protuberance between them, within the spirit of the invention described generally above, and as governed by the scope of the following claims. As described above, all threaded parts of the valve bodies of which the centerlines coincide with the centerlines of the extruder screws, are threaded left-handedly to prevent the disengagement of the former under operational conditions.

I claim:

1. In injection molding apparatus for thermoplastic material having a heated cylindrical barrel containing a rotating and reciprocating feedscrew therein for feeding the molten and fluid thermoplastic material therethrough past a non-return check valve, towards a discharge chamber at the forward end of said barrel, said non-return check valve comprising
   a. a main valve element comprising a valve body mounted on the forward end of said feedscrew having a plurality of equidistantly distributed cylindrical passages therein extending from the periphery of the feedscrew with forward inclinations towards the center thereof,
   b. an auxiliary valve element comprising a reciprocable circular valve plate movably mounted relative to the front face of said valve body, of smaller diameter than said barrel, for directing outwardly and radially the thermoplastic material issuing through said valve body into said discharge chamber, and
   c. a convexly contoured annular protuberance of one of said valve elements cooperating with the adjacent surface of the other valve element to provide a smoothly streamlined passage for the fluid material in the course of the rearward and rotary movement of said feedscrew to effect the radial inflow of the material into said chamber, and to form a sealing dam against the reverse flow of the fluid material within said barrel in response to the forward reciprocating movement of said feedscrew which effects the ejection of said fluid material from said chamber.

2. An assembly as set forth in claim 1, wherein the outermost portion of said last-mentioned protuberance terminates in a flattened surface to increase the effective area of surface contact of said non-return check valve.

3. An assembly as set forth in claim 1, including at least one retaining screw for mounting said valve plate adjacent to the front face of said valve body for free sliding movement thereon, and means for adjusting the extent of said movement to determine the incidence of the effectiveness of said sealing dam at said protuberance.

4. In injection molding apparatus for thermoplastic material having a heated cylindrical barrel containing a rotating and reciprocating feedscrew therein for feeding the molten and fluid thermoplastic material therethrough past a non-return check valve, towards a discharge chamber at the forward end of said barrel, said non-return check valve comprising
   a. a main valve body mounted on the forward end of said feedscrew having a plurality of equidistantly distributed cylindrical passages therein extending from the periphery of the feedscrew with forward inclinations towards the center thereof, and a flaring wall extending from the latter to the front end of said body,
   b. a reciprocable circular valve plate movably mounted relative to the front face of said valve body, of smaller diameter than said barrel, for directing outwardly and radially the thermoplastic material issuing through said valve body into said discharge chamber, and said valve plate having a substantially flat front face and a tapered conical rear face cooperating with said flaring wall to define a passageway for said material in the course of the rearward and rotary movement of the feedscrew, to effect the radial inflow of the material into said chamber, and
   c. a convexly contoured annular protuberance on said conical rear face adapted to abut said flaring wall and thereby to form a sealing dam against the reverse flow of the fluid material within said barrel in response to the forward reciprocating movement of said feedscrew which effects the ejection of said fluid material from said chamber.

5. An assembly as set forth in claim 4, wherein the outermost portion of said last-mentioned protuberance terminates in a frustoconical surface of revolution having a conicity corresponding to that of said flaring wall.

6. An assembly as set forth in claim 5, wherein the cylindrical bores in the main valve body are diametrically opposed and are of relatively large diameter which merge with a central passage of comparable diameter behind said flaring wall.

7. An assembly as set forth in claim 6, wherein said valve plate is provided with a plurality of equidistantly distributed openings adjacent to the periphery thereof, a plurality of headed retaining screws for said valve plate passing loosely through said openings to permit floating movement of the latter between the heads of the screws and said flaring wall on said valve body.

8. An assembly as set forth in claim 7, wherein the retaining screws and openings are three in number with a radial angular displacement of 120° between them.

9. An assembly as set forth in claim 7, wherein said headed retaining screws are adjustably mounted in the front end of said main valve body to control the speed of the non-return valve action.

10. In injection molding apparatus for thermoplastic material having a heated cylindrical barrel containing a rotating and reciprocating feedscrew therein for feeding the molten and fluid thermoplastic material therethrough past a non-return check valve, towards a discharge chamber at the forward end of said barrel, said non-return check valve comprising
    a. a main valve body mounted on the forward end of said feedscrew having a plurality of equidistantly distributed cylindrical passages therein, each having its inlet extending from the periphery of the feedscrew at the rear end of said body to its outlet at the front end thereof at a slight inclination towards the center, b. a reciprocable circular valve plate movably mounted relative to the front face of said valve body, of smaller diameter than said barrel, for directing outwardly and radially the thermoplastic material issuing through said valve body into said discharge chamber, and provided with a cylindrical opening at the center thereof, c. a headed retaining screw affixed to the central part of the front face of said main body having a smooth shank behind the head of the screw, for supporting said valve plate for smooth sliding movement at said cylindrical opening, and d. a convexly contoured annular protuberance on the front face of said main valve body beyond the outlet ends of said passages to define, in conjunction with the rear face of said valve plate, a smoothly streamlined passageway for the fluid material in the course of the rearward and rotary movement of said feedscrew to effect the radial inflow of the material into said chamber, and to form a sealing dam against the reverse flow of fluid material within said barrel in response to the forward reciprocating movement of said feedscrew and the consequent rearward movement of said valve plate and the abutment of the rear face thereof against said protuberance.

11. An assembly as set forth in claim 10, wherein the outermost portion of said protuberance terminates in a flat annular surface of small width.

12. An assembly as set forth in claim 10, wherein said headed retaining screw is adjustably mounted in the front end of said main valve body to control the speed of the non-return valve action.

* * * * *

UNITED STATES PATENT OFFICE
CERTIFICATE OF CORRECTION

Patent No. 4,062,479   Dated December 13, 1977

Inventor(s) BELA G. SZABO

It is certified that error appears in the above-identified patent and that said Letters Patent are hereby corrected as shown below:

In column 5, line 44, "of" should read --on--.

In column 6, line 43, --and-- should be inserted before "a"

Signed and Sealed this

Fourteenth Day of March 1978

[SEAL]

Attest:

RUTH C. MASON
Attesting Officer

LUTRELLE F. PARKER
Acting Commissioner of Patents and Trademarks